United States Patent [19]
Xiao

[11] Patent Number: 6,116,732
[45] Date of Patent: Sep. 12, 2000

[54] INTERLOCKABLE MAGNETIC SHELTER FRAME FOR SPECTACLE FRAME

[76] Inventor: Tony Xin Xiao, 1235 Lindengrove Ave., Rowland Heights, Calif. 91748

[21] Appl. No.: 09/452,559

[22] Filed: Dec. 1, 1999

[51] Int. Cl.[7] .................................................. G02C 9/00
[52] U.S. Cl. ........................................... 351/47; 351/57
[58] Field of Search ............................. 351/47, 57, 48, 351/58, 44, 41

[56] References Cited

U.S. PATENT DOCUMENTS 5,975,691  11/1999  Ku ............................................. 351/47

*Primary Examiner*—Hung Xuan Dang
*Attorney, Agent, or Firm*—Raymond Y. Chan; David and Raymond

[57] ABSTRACT

An interlockable magnetic shelter frame is adapted for mounting on a primary spectacle frame which comprises a frame body for mounting a pair of lenses in position. The frame body includes a primary bridge connected between the two lenses and two side extensions provided at two outer sides of the lenses respectively each having a hinge portion extended rearwardly therefrom for pivotally coupling a temple. Each of the side extensions has a engagement means provided on a rear side thereof. The shelter frame for supporting two auxiliary lenses includes a bridge extended between the two auxiliary lenses, two side interlocking means which are provided at two outer sides of the two auxiliary lenses respectively for interlocking with the two side extensions of the frame body of the primary spectacle frame so as to securely mount the shelter frame on the primary spectacle frame. Each of the interlocking means includes a supporting arm extended rearwardly for riding on top of the respective side extension of the body frame of the primary spectacle frame, and a magnetic seat downwardly connected from the supporting arm for magnetically attracting from behind the respective side extension and engaging with the respective engagement means of the respective side extension so as to securely mount the shelter frame in front of the primary spectacle frame.

22 Claims, 8 Drawing Sheets

INTERLOCKABLE MAGNETIC SHELTER FRAME FOR SPECTACLE FRAME

BACKGROUND OF THE PRESENT INVENTION

1. Field of the Invention

The present invention relates to a spectacle frame, and more particularly to an interlocking magnetic shelter frame for supporting auxiliary lenses, such as sunglasses, wherein the interlocking magnetic shelter frame is adapted for detachably mounting on a primary spectacle frame by means of a magnetic means equipped with an interlocking engagement.

2. Description of Related Arts

An auxiliary shelter frame is widely be used today. A conventional shelter frame such as clip-on sunglasses is adapted to detachably mount on shortsighted or longsighted eyeglasses, so that wearer does not need to pay for and carry another shortsighted or longsighted sunglasses. However, the clip-on sunglasses must protrude a plurality of clipping claws in order to mount on the primary eyeglasses, the clipping claws may scratch the lenses of the primary eyeglasses during the mounting process. Also, the conventional clip-on sunglass requires both hands operation in order to align the clip-on sunglasses on the primary eyeglasses in correct position. It is dangerous that the wearer needs both hands to operate the clip-on sunglasses while he or she is driving.

In order to solve the problems of the above mentioned clip-on sunglasses, magnetic attachment is recently introduced into the eyeglasses industry. A primary pair of magnet members are affixed on two upper side extensions of a primary spectacle frame respectively. An auxiliary shelter frame such as a sunglasses includes a pair of arms for engaging over the two upper side extensions for preventing the auxiliary shelter frame from moving downward relative to the primary spectacle frame and having an auxiliary pair of magnet members for engaging with the primary magnet members of the primary spectacle frame and for stably attaching the auxiliary shelter frame to the primary spectacle frame. However, the users have to align two pairs of magnet members. If the auxiliary magnet members of the sunglasses are misaligned with the primary magnet members of the primary spectacle frame, the sunglasses will fall down from the primary spectacle frame easily.

Although the mounting process of the conventional auxiliary magnetic shelter frame is as simple as putting the auxiliary shelter frame on the face of the primary spectacle frame that the auxiliary shelter frame will be automatically attached on the primary spectacle frame, the weight of the eyeglasses is heavier than usual. It will make the wearer uncomfortable because of the additional magnet members installed thereon for ensuring magnetic attraction with the sunglasses.

Moreover, since the auxiliary shelter frame and the primary spectacle frame are connected by two sets of engaging members, the wearer would easily misalign the auxiliary shelter frame on the primary spectacle frame and the auxiliary shelter frame will drop off from the primary spectacle frame easily, especially during sporting and doing exercise.

Also, the magnet members on the primary frame, according to the prior arts, adversely affect the entire ornamental appearance of the primary frame. If a pair of smaller engaging members is substituted in order to keep the ornamental appearance of the primary spectacle frame, not only the wearer will suffer in the difficulty of aligning the auxiliary shelter frame with the primary spectacle frame, but also the auxiliary shelter frame will easily drop off due to even a slightly head shake.

SUMMARY OF THE PRESENT INVENTION

The main object of the present invention is to provide an interlockable magnetic shelter frame for spectacle mounting on a primary frame, wherein the interlockable magnetic shelter frame can be precisely and easily attached on a primary spectacle frame by magnetic attraction. Moreover, the shelter frame is arranged to interlock with the primary spectacle frame so that the shelter frame is securely mounted on the primary spectacle frame.

Another object of the present invention is to provide an interlockable magnetic shelter frame for mounting on a primary spectacle frame, wherein the two arms of the magnetic shelter frame not only is magnetically attracted to the two side extensions of the primary spectacle frame, but also is arranged to engage with the two side extensions of the primary spectacle, so as to prevent up and down movement or sideward movement of the magnetic shelter frame with respect to the primary spectacle frame once the magnetic shelter frame is mounted in position.

Another object of the present invention is to provide an interlockable magnetic shelter frame for mounting on a primary spectacle frame, wherein even though the magnetic shelter frame is magnetically attracted and engaged with the primary spectacle frame, the wearer still may merely use one hand to attach or detach the shelter frame during exercising or driving.

Another object of the present invention is to provide an interlockable magnetic shelter frame for mounting on a primary spectacle frame wherein the engaging members are arranged at the rear side of the primary spectacle frame so that no magnet member is appeared in front. In other words, the ornamental appearance of the primary spectacle can thus be maintained, so that the primary spectacle frame looks identical to a common spectacle frame even though the magnetic shelter frame is removed.

Another object of the present invention is to provide an interlockable magnetic shelter frame for primary mounting on a primary spectacle frame wherein at least the two side extensions of the primary spectacle frame are made of soft-magnetic metal having magnetic attraction ability such as mild steel, low carbon steel and high grade steel, so that no additional engaging member is need to affix on the primary spectacle frame so as to further reduce the weight of the primary spectacle frame. Furthermore, it also enables the entire primary spectacle frame, including the two side extensions, to be electroplated in one step.

Another object of the present invention is to provide an interlockable magnetic shelter frame for mounting on a primary spectacle frame, wherein the shelter frame provides a bridge clipper for clipping the bridge of the primary spectacle frame, so as to further securely mount the shelter frame on the primary spectacle frame.

In order to accomplish the above objects, the present invention provides an interlockable magnetic shelter frame adapted for mounting in front of a primary spectacle frame which comprises a frame body for mounting a pair of lenses in position. The frame body comprises a bridge connected between the two lenses and two side extensions provided at two outer sides of the lenses respectively each having a hinge portion extended rearwardly therefrom for pivotally coupling a temple. Each of the side extensions has a engagement means provided on a rear side thereof.

The shelter frame for supporting two auxiliary lenses comprises a bridge extended between the two auxiliary lenses, two side interlocking means which are provided at two outer sides of the two auxiliary lenses respectively for interlocking with the two side extensions of the frame body of the primary spectacle frame so as to securely mount the shelter frame on the primary spectacle frame.

Each of the interlocking means comprises a supporting arm extended rearwardly for riding on top of the respective side extension of the body frame of the primary spectacle frame, and a magnetic seat which comprises a magnet housing downwardly connected from the supporting arm and a magnet mounted in the magnet housing with one magnetic pole thereof arranged to face towards and align with the engagement means of the respective side extension when the shelter frame is mounted on the frame body of the primary spectacle frame.

In order to mount the shelter frame in front of the frame body of the primary spectacle frame, simply put the shelter frame in front of the primary spectacle frame and drop it down. Due to the magnetic attraction, the two magnetic seat of the shelter frame are magnetically attracted from behind to engage with the two engagement means of the two side extensions of the frame body of the primary spectacle frame respectively. Thus, the two interlocking means of the shelter frame are respectively interlocked with the two side extensions of the frame body. So, the present invention provides not only the magnetic attraction but also the interlocking engagement for securely mounting the shelter frame on the primary spectacle frame.

DETAILED DESCRIPTION OF THE PREFERRED EMBODIMENT

Figure 1:
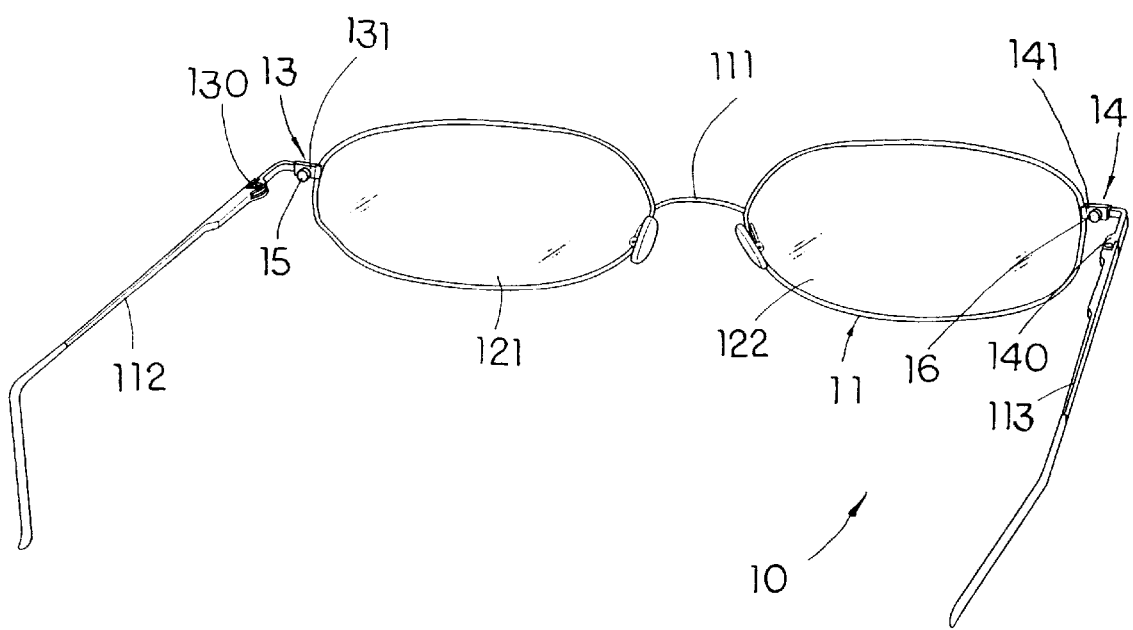
FIG. 1 is a rear perspective view of a primary spectacle fra according to a first preferred embodiment of the present invention.

Referring to FIGS. 1 to 4 of the drawings, an interlockable magnetic shelter frame 20 adapted for mounting on primary spectacle frame 10 according to a first preferred embodiment of the present invention is illustrated. The primary spectacle frame 10 comprise a frame body 11 for mounting a pair of lenses 121, 122 in position. The frame body 11 comprises a primary bridge 111 connected between the two lenses 121, 122, two side extensions 13, 14 provided at two outer sides of the lenses 121, 122 respectively each having a hinge portion 130, 140 extended rearwardly therefrom for pivotally coupling a temple 112, 113.

Practically, the frame body 11 can be constructed as a conventional spectacle frame to have a pair of rims as shown in FIG. 1 or a rimless frame that the primary bridge 111 and the two side extensions 13, 14 are directly fastened to the edges of the two lenses 121, 122. The major different between the frame body 11 of the present invention and the conventional spectacle frame is the two side extensions 13, 14, each of which has a engagement means provided on a rear side 131, 141 thereof.

Figure 3:
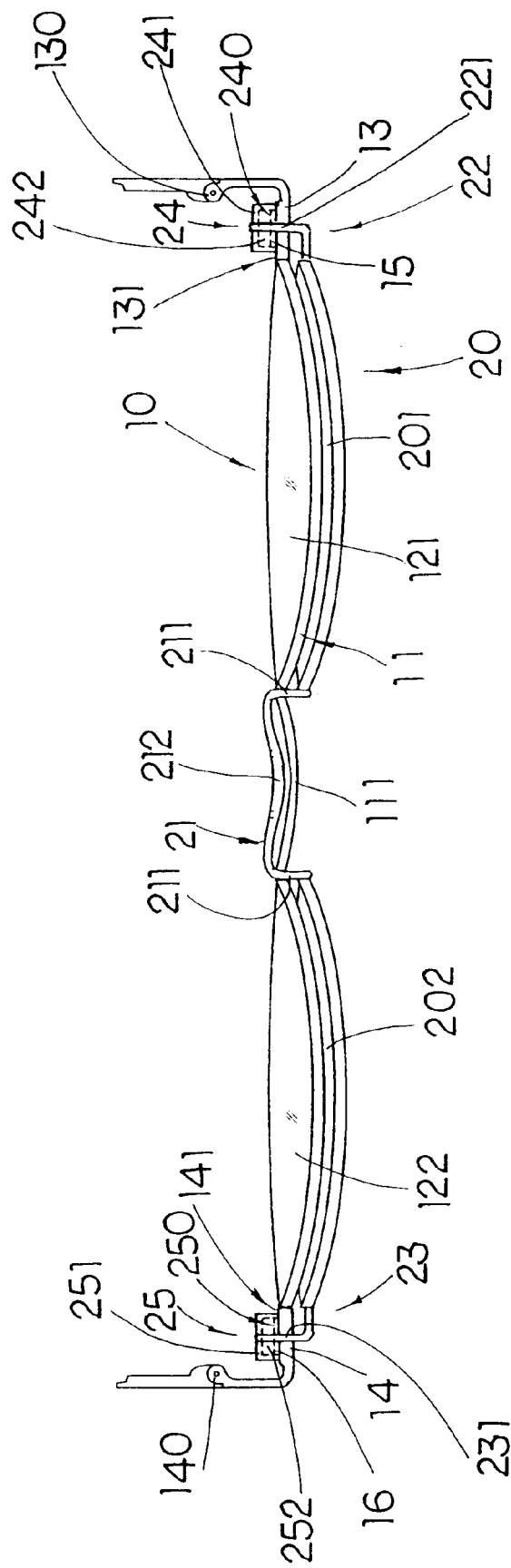
FIG. 3 is a top view of the shelter frame mounted on the primary spectacle frame according to the above first preferred embodiment of the present invention.
Figure 4:
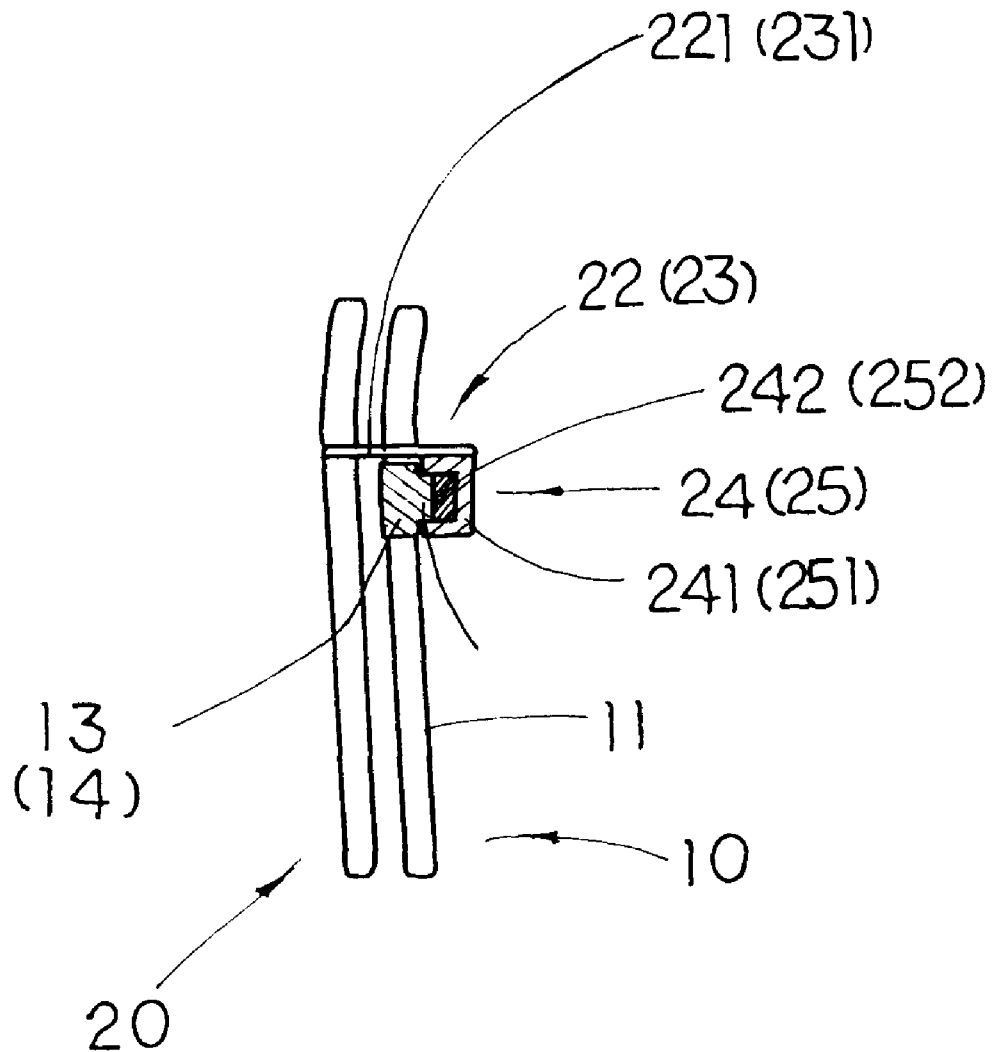
FIG. 4 is a partially sectional view of the shelter frame mounted on the primary spectacle frame according to the above first preferred embodiment of the present invention.

As shown in FIGS. 1, 3 and 4, according to the first preferred embodiment of the present invention, the two side extensions 13, 14 are preferred to be made of soft-magnetic metal having magnetic attraction ability such as mild steel, low carbon steel and high grade steel, each of the two engagement means comprises a circular engaging member 15, 16 integrally protruded from the respective rear side 131, 141 of the respective side extension 13, 14. In other words, the engaging members 15, 16 are also made of soft-magnetic metal that is attractive to magnetic material such as permanent magnet.

Figure 2:
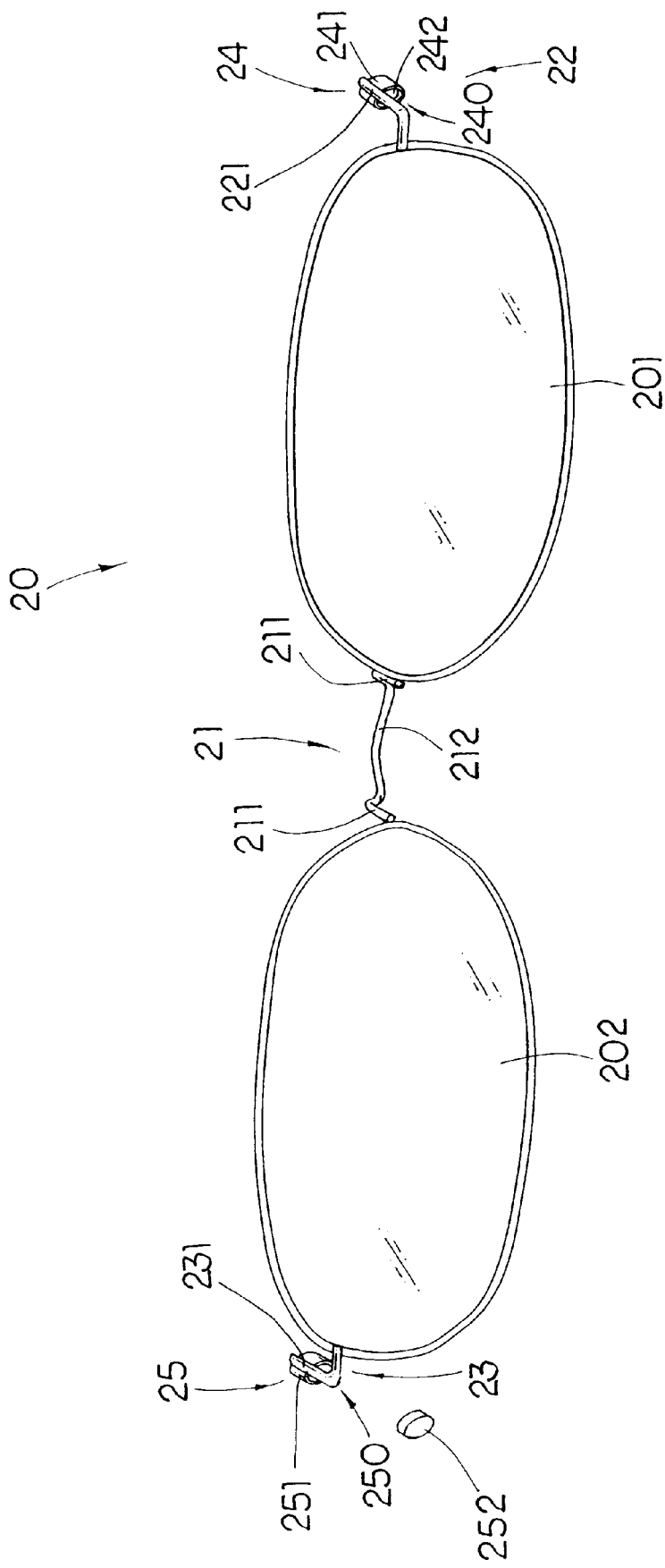
FIG. 2 is a front perspective view of a shelter frame according to the above first preferred embodiment of the present invention.

Referring to FIGS. 2, 3 and 4, the shelter frame 20 for supporting two auxiliary lenses 201, 202 comprises a bridge 21 extended between the two auxiliary lenses 201, 202, two side interlocking means 22, 23 which are provided at two outer sides of the two auxiliary lenses 201, 202 respectively for interlocking with the two side extensions 13, 14 of the frame body 11 of the primary spectacle frame 10 so as to securely mount the shelter frame 20 on the primary spectacle frame 10. The two auxiliary lenses 201, 202 can be shaded lenses supported by the shelter frame 20 to form a detachable sunglasses.

Each of the interlocking means 22, 23 comprises a supporting arm 221, 231 extended rearwardly for riding on top of the respective side extension 13, 14 of the body frame 11 of the primary spectacle frame 10, and a magnetic seat 24, 25 downwardly connected from the supporting arm 221, 231. A circular engagement groove 240, 250 is formed on a front face of each of the two magnetic seats 24, 25, wherein the depth of each of the engagement grooves 240, 250 must be larger than the thickness of the engaging members 15, 16 and the diameter of each of the engagement grooves 240, 250 is preferably equal to or slighter larger than the diameter of the engaging members 15, 16, so that the two engaging members 15, 16 can be fittedly engaged into the two engagement grooves 240, 250 when the shelter frame 20 is mounted on the primary spectacle frame 10 as shown in FIG. 3, so as to further interlock the shelter frame 20 with the primary spectacle frame 10 by preventing any upward, downward, leftward, and rightward movement of the shelter frame 20.

The two magnetic seats 24, 25 can also be integrally made of permanent magnetic metal, and the two engagement grooves 240, 250 are indented on the front faces thereof. However, according to the first preferred embodiment of the present invention, each of the magnetic seats 24, 25 is preferred to be constructed by a magnet housing 241, 242, which is made of non-magnetic material or soft-magnetic metal having magnetic attraction ability such as mild steel, low carbon steel and high grade steel and downwardly connected from the supporting arm 221, 231, and a permanent magnet 242, 252 mounted in the magnet housing 241, 251 with one magnetic pole thereof arranged to face towards and align with the respective engaging member 15, 16 of the respective side extension 13, 14 when the shelter frame 20 is mounted on the frame body 11 of the primary spectacle frame 10.

According to the first preferred embodiment, the two magnets 242, 252 are two circular permanent metallic magnets having a diameter equal to or slighter larger than the diameter of the engaging members 15, 16. Moreover, the thickness of the two magnets 242, 252 are respectively smaller than the depth of the two magnet housings 241, 251 so as to define the two circular engagement grooves 240, 250 when the two magnets 242, 252 are respectively embedded in the two magnet housings 241, 251 for engaging with the two circular engaging members 15, 16 of the two side extensions 13, 14 of the primary spectacle frame 10.

As shown in FIGS. 3 and 4, when the two supporting arms 221, 231 ride on the two side extensions 13, 14 respectively, the two magnetic seats 24, 25 will attract from behind with the two engaging members 15, 16 of the two side extensions 13, 14 of the frame body 11 of the primary spectacle frame 10 respectively until the two protruded engaging members 15, 16 are coaxially inserted into the engagement grooves 240, 250 respectively, so as to firmly engage the shelter frame 20 with the primary spectacle frame 10 in an interlocking manner.

It is well known that the magnetic attraction force between two magnets is an axial linear force that has low resistant to shear force applied between the two magnets. By means of the engagement structure of the two protruding engaging members 15, 16 and the two indented engagement grooves 240, 250, the axial magnetic attraction between engaging members 15, 16 of the shelter frame 20 and the two magnets 242, 252 of the primary spectacle frame 10 is ensured by enhancing the resistant to any shear force that may be applied to the two engaging members 15, 16. Moreover, any upward downward or sideward movements of the shelter frame 20 can also be blocked and prevented so as to ensure the shelter frame 20 being firmly mounted on the primary spectacle frame 10.

As shown in FIGS. 2 and 3, the bridge 21 of the shelter frame 20 is a clip-bridge that is generally in U-shaped and comprises two rearwardly extending side wires 211 adapted for supporting on two ends of the primary bridge 111 of the frame body 11 and a downwardly curved clipping wire 212 extending behind the primary bridge 111, so that the clip-bridge 21 is clipped on the primary bridge 111 when the shelter frame 20 is mounted on the primary spectacle frame 10.

Alternatively, the two engaging members 15, 16 can be made of two circular shaped permanent magnet members integrally affixed to the two rear sides 131, 141 of the two side extensions 13, 14 which are made of non magnetic material, so as to enhance the magnetic attraction between the side extensions 13, 14 and the two magnets 242, 252 of the two magnetic seats 24, 25. Moreover, if the two engaging members are magnet members, then the two magnetic seat can also be integrally made of soft-magnetic metal having magnetic attraction ability such as mild steel, low carbon steel and high grade steel, and the two engagement grooves 240, 250 are simply indented on the front faces thereof. Good magnetic attraction and engagement between the two engaging members 15, 16 and the two magnetic seats 24, 25 can also be achieved.

In order to mount the shelter frame 20 in front of the frame body 11 of the primary spectacle frame 10, the user may simply use one hand to put the shelter frame 20 in front of the primary spectacle frame 10 and drop it down. Due to the magnetic attraction, the two magnetic seats 24, 25 of the shelter frame 20 are magnetically attracted from behind to engage with the two engaging members 15, 16 of the two side extensions 13, 14 of the frame body 11 of the primary spectacle frame 10 respectively. Moreover, the two protruded engaging members 15, 16 can further guide the two magnetic seats 24, 25 to automatically align and attract with the two side extensions 13, 14 respectively. At the same time, the enhanced axial attraction between the two engaging members 15, 16 and the two magnets 242, 252 can also ensure the engagement between the magnetic seats 24, 25 and the two side extensions 13, 14. Thus, the two interlocking means 22, 23 of the shelter frame 20 are respectively interlocked with the two side extensions 13, 14 of the frame body 11. So, the present invention provides not only the magnetic attraction but also the interlocking engagement for securely mounting the shelter frame 20 on the primary spectacle frame 10.

According to the present invention, the user can also detach the shelter frame 20 from the primary spectacle frame 10 easily by slightly pushing the shelter frame 20 towards the primary spectacle frame 10 until the two magnetic seats 24, 25 of the two interlocking means 22, 23 move rearwardly apart from the two engaging members 15, 16, so that the magnetic attraction and mechanical engagement between the shelter frame 20 and the primary spectacle frame 10 are released at the same time, and then the user may detach the shelter frame 20 by simply lifting it up from the primary spectacle frame 10 with one hand.

Figure 5:
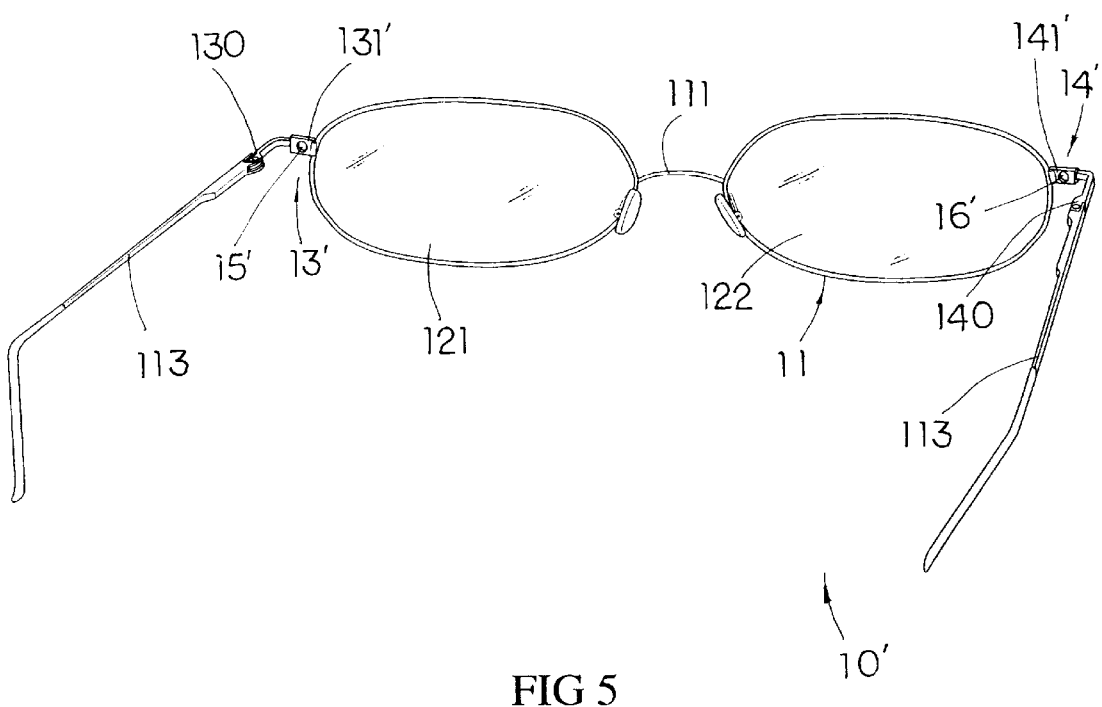
FIG. 5 is a rear perspective view of a primary spectacle frame according to a second preferred embodiment of the present invention.
Figure 6:
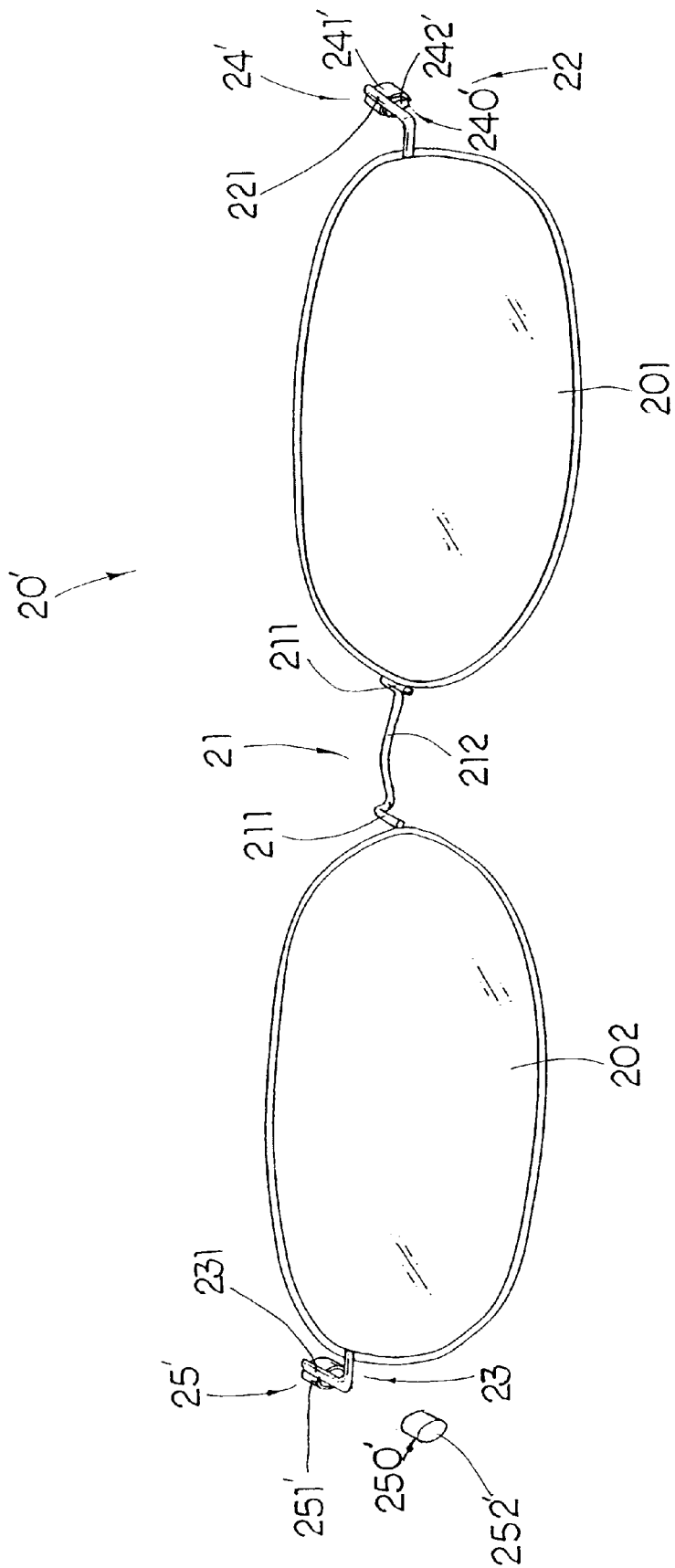
FIG. 6 is a front perspective view of a shelter frame according to the above second preferred embodiment of the present invention.
Figure 7:
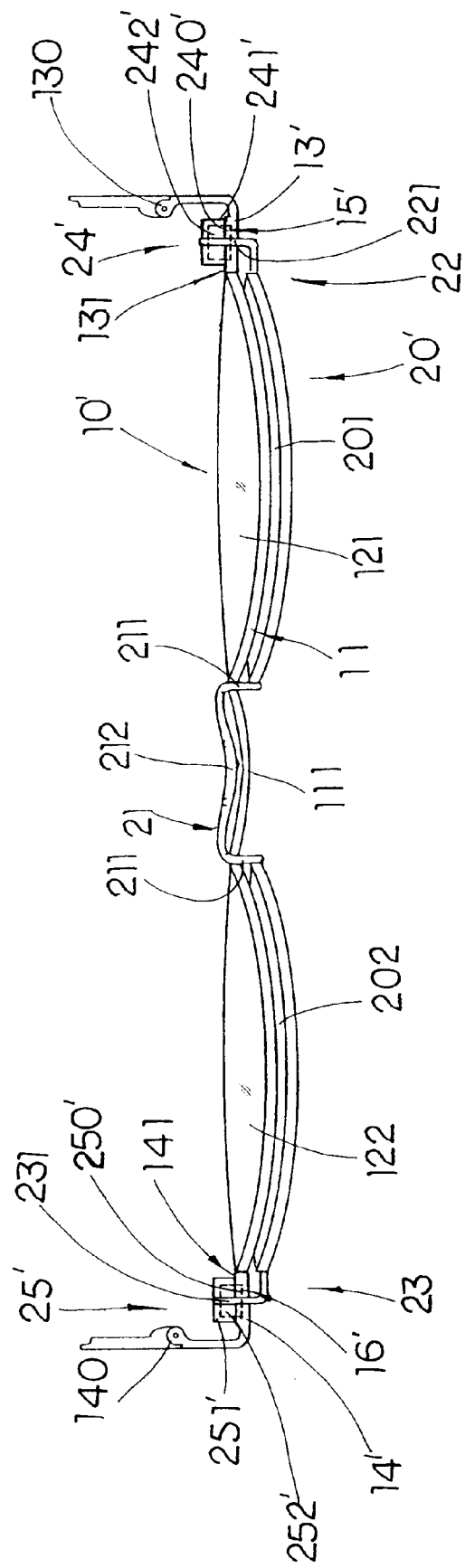
FIG. 7 is a top view of the shelter frame mounted on the primary spectacle frame according to the above second preferred embodiment of the present invention.
Figure 8:
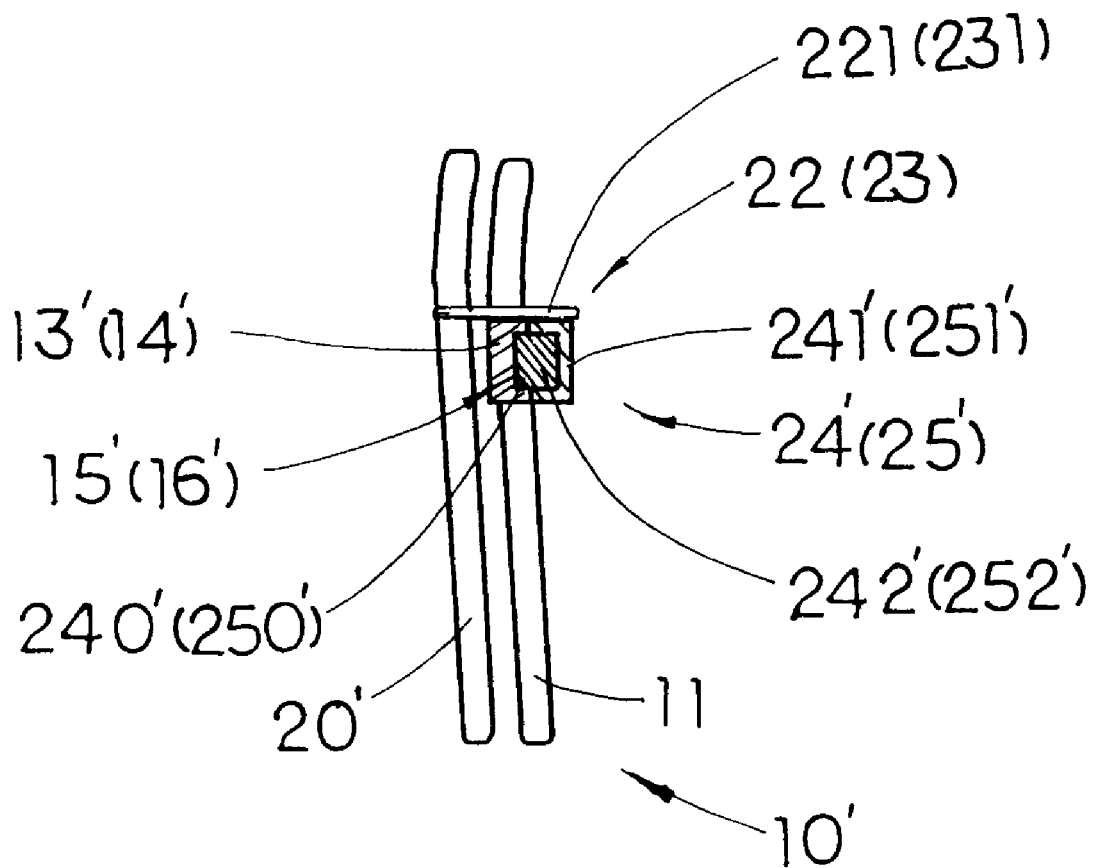
FIG. 8 is a partially sectional view of the shelter frame mounted on the primary spectacle frame according to the above second preferred embodiment of the present invention.

Referring to FIGS. 5 to 8, alternative modes of shelter frame 20' and primary spectacle frame 10' according to a second preferred embodiment of the present invention is illustrated. As shown in FIGS. 5 and 6, the attraction and engagement concept and structure of the second embodiment is same as the above first embodiment. The modification in the second embodiment includes that the two magnets 242, 252 are made to have a thickness larger than the depth of the magnet housing 241, 251 so that a pole end of each of the magnets 242, 252 is frontwardly protruded from the respective magnet housing 241, 252 to form two engaging members 240', 250' instead of the two engagement grooves 240, 250 in the above first embodiment. Correspondingly, two circular engagement grooves 15', 16' are respectively indented on the two rear sides 131', 141' of the two side extensions 13', 14', which are made of soft-magnetic metal having magnetic attraction ability, such as mild steel, low carbon steel and high grade steel. Each of the two engagement grooves 15', 16', for substitute the two engaging members 15, 16 of the first embodiment, has a diameter equal to or slightly larger than the diameter of the magnets 242', 252'.

The mounting and detaching operation of the shelter frame 20' and the primary spectacle frame 10' is the same as the above first embodiment. However, when the shelter frame 20' is put in front of the primary spectacle frame 10 and drop it down. Due to the magnetic attraction, the two engaging members 240', 250' of the two magnetic seats 24', 25' of the shelter frame 20' are magnetically attracted from behind to insert into the two engagement grooves 15', 16' so as to engage with the two side extensions 13', 14' of the primary spectacle frame 10' respectively. The magnetic attraction and engagement structure of the two engaging members 240', 250' and the two engagement grooves 15', 16' also provides automatic alignment, engagement, and guiding functions as described in the above first embodiment.

What is claimed is:

1. An interlockable magnetic shelter frame for mounting on a primary spectacle frame which comprises a frame body for mounting a pair of lenses in position, wherein said frame body comprises a primary bridge connected between said two lenses and two side extensions provided at two outer sides of said lenses respectively;

each of said side extensions having a hinge portion extended rearwardly therefrom for pivotally coupling a temple, and an engagement means provided on a rear side thereof;

said shelter frame, which supports two auxiliary lenses thereon, comprising a bridge extended between said two auxiliary lenses, two side interlocking means which are provided at two outer sides of said two auxiliary lenses respectively for interlocking with said two side extensions of said frame body of said primary spectacle frame so as to securely mount said shelter frame on said primary spectacle frame;

each of said interlocking means comprising a supporting arm extended rearwardly for riding on top of said respective side extension of said body frame of said primary spectacle frame, and a magnetic seat downwardly connected from said supporting arm for magnetically attracting from behind said respective side extension and engaging with said respective engagement means of said respective side extension so as to securely mount said shelter frame in front of said primary spectacle frame;

wherein said two engagement means comprise two engaging members integrally protruded from said two rear sides of said two side extensions respectively, and that an engagement groove is formed on a front face of each of said two magnetic seats, wherein said two engaging members are arranged to fittedly engage into said two engagement grooves when said shelter frame is mounted in front of said primary spectacle frame so as to further interlock said shelter frame with said primary spectacle frame by preventing upward, downward, leftward, and rightward movements of said shelter frame.

2. The interlockable magnetic shelter frame for mounting on the primary spectacle frame, as recited in claim 1, wherein said two side extensions are made of soft-magnetic metal having magnetic attraction ability.

3. The interlockable magnetic shelter frame for mounting on the primary spectacle frame, as recited in claim 2, wherein each of said magnetic seats comprises a magnet housing which is made of non-magnetic material and downwardly connected from said respective supporting arm and a magnet mounted in said magnet housing with one magnetic pole thereof arranged to face towards and align with said respective engaging member of said respective side extension when said shelter frame is mounted in front of said frame body of said primary spectacle frame.

4. The interlockable magnetic shelter frame for mounting on the primary spectacle frame, as recited in claim 3, wherein a thickness of each of said two magnets is smaller than a depth of said two magnet housings so as to define said two engagement grooves when said two magnets are respectively embedded in said two magnet housings for engaging with said two engaging members of said two side extensions of said primary spectacle frame.

5. The interlockable magnetic shelter frame for mounting on the primary spectacle frame, as recited in claim 4, wherein each of said engaging members, said magnets and said engagement grooves is in circular shaped, and each of said two magnets having a diameter at least equal to a diameter of said engaging members.

6. The interlockable magnetic shelter frame for mounting on the primary spectacle frame, as recited in claim 1, wherein said two engaging members are made of permanent magnets integrally affixed on said two rear sides of said two side extensions, and that said two magnetic seats are integrally made of soft-magnetic metal having magnetic attraction ability, and said two engagement grooves are indented on said front faces thereof.

7. The interlockable magnetic shelter frame for mounting on the primary spectacle frame, as recited in claim 1, wherein each of said magnetic seats comprises a magnet housing which is made of non-magnetic material and downwardly connected from said respective supporting arm and a magnet mounted in said magnet housing with one magnetic pole thereof arranged to face towards and align with said respective engaging member of said respective side extension when said shelter frame is mounted in front of said frame body of said primary spectacle frame.

8. The interlockable magnetic shelter frame for mounting on the primary spectacle frame, as recited in claim 7, wherein a thickness of each of said two magnets is smaller than a depth of said two magnet housings so as to define said two engagement grooves when said two magnets are respectively embedded in said two magnet housings for engaging with said two engaging members of said two side extensions of said primary spectacle frame.

9. The interlockable magnetic shelter frame for mounting on the primary spectacle frame, as recited in claim 8, wherein each of said engaging members, said magnets and said engagement grooves is in circular shaped, and each of said two magnets having a diameter at least equal to a diameter of said engaging members.

10. The interlockable magnetic shelter frame for mounting on the primary spectacle frame, as recited in claim 1, wherein said two engaging members are made of permanent magnets integrally affixed on said two rear sides of said two side extensions, and that each of said magnetic seats comprises a magnet housing which is made of non-magnetic material and downwardly connected from said respective supporting arm and a magnet mounted in said magnet housing with one magnetic pole thereof arranged to face towards and align with said respective engaging member of said respective side extension when said shelter frame is mounted in front of said frame body of said primary spectacle frame.

11. The interlockable magnetic shelter frame for mounting on the primary spectacle frame, as recited in claim 10, wherein a thickness of each of said two magnets is smaller than a depth of said two magnet housings so as to define said two engagement grooves when said two magnets are respectively embedded in said two magnet housings for engaging with said two engaging members of said two side extensions of said primary spectacle frame.

12. The interlockable magnetic shelter frame for mounting on the primary spectacle frame, as recited in claim 11, wherein each of said engaging members, said magnets and said engagement grooves is in circular shaped, and each of said two magnets having a diameter at least equal to a diameter of said engaging members.

13. An interlockable magnetic shelter frame for mounting on a primary spectacle frame which comprises a frame body for mounting a pair of lenses in position, wherein said frame body comprises a primary bridge connected between said two lenses and two side extensions provided at two outer sides of said lenses respectively;

each of said side extensions having a hinge portion extended rearwardly therefrom for pivotally coupling a temple, and an engagement means provided on a rear side thereof;

said shelter frame, which supports two auxiliary lenses thereon, comprising a bridge extended between said two auxiliary lenses, two side interlocking means which are provided at two outer sides of said two auxiliary lenses respectively for interlocking with said two side extensions of said frame body of said primary spectacle frame so as to securely mount said shelter frame on said primary spectacle frame;

each of said interlocking means comprising a supporting arm extended rearwardly for riding on top of said respective side extension of said body frame of said primary spectacle frame, and a magnetic seat downwardly connected from said supporting arm for magnetically attracting from behind said respective side extension and engaging with said respective engagement means of said respective side extension so as to securely mount said shelter frame in front of said primary spectacle frame;

wherein said two side extensions are made of magnetic attractable material, said two engagement means having two engagement grooves indented on said two rear sides of said two side extensions respectively, wherein two engaging members which are made of magnetic material are protruded from front faces of said two magnetic seats respectively, wherein said two engaging members are arranged to fittedly engage into said two engagement grooves when said shelter frame is mounted in front of said primary spectacle frame so as to further interlock said shelter frame with said primary spectacle frame by preventing upward, downward, leftward, and rightward movements of said shelter frame.

14. The interlockable magnetic shelter frame for mounting on the primary spectacle frame, as recited in claim 13, wherein said two side extensions are made of soft-magnetic metal having magnetic attraction ability.

15. The interlockable magnetic shelter frame for mounting on the primary spectacle frame, as recited in claim 14, wherein each of said magnetic seats comprises a magnet housing which is made of non-magnetic material and downwardly connected from said respective supporting arm and a magnet mounted in said magnet housing with one magnetic pole thereof arranged to face towards and align with said respective engagement groove of said respective side extension when said shelter frame is mounted in front of said frame body of said primary spectacle frame.

16. The interlockable magnetic shelter frame for mounting on the primary spectacle frame, as recited in claim 15, wherein said two magnets are made to have a thickness larger than a depth of said magnet housing, wherein a pole end of each of said magnets is frontwardly protruded from said respective magnet housing to form said two engaging member.

17. The interlockable magnetic shelter frame for mounting on the primary spectacle frame, as recited in claim 16, wherein each of said engaging members, said magnets and said engagement grooves is in circular shaped, and each of said two magnets having a diameter at least equal to a diameter of said engaging members.

18. The interlockable magnetic shelter frame for mounting on the primary spectacle frame, as recited in claim 17, said bridge of said shelter frame is a clip-bridge which is generally in U-shaped and comprises two rearwardly extending side wires adapted for supporting on two ends of said primary bridge of said frame body and a downwardly curved clipping wire extending behind said primary bridge, wherein said clip-bridge is clipped on said primary bridge when said shelter frame is mounted in front of said primary spectacle frame.

19. The interlockable magnetic shelter frame for mounting on the primary spectacle frame, as recited in claim 16, said bridge of said shelter frame is a clip-bridge which is generally in U-shaped and comprises two rearwardly extending side wires adapted for supporting on two ends of said primary bridge of said frame body and a downwardly curved clipping wire extending behind said primary bridge, wherein said clip-bridge is clipped on said primary bridge when said shelter frame is mounted in front of said primary spectacle frame.

20. The interlockable magnetic shelter frame for mounting on the primary spectacle frame, as recited in claim 13, wherein each of said magnetic seats comprises a magnet housing which is made of non-magnetic material and downwardly connected from said respective supporting arm and a magnet mounted in said magnet housing with one magnetic pole thereof arranged to face towards and align with said respective engagement groove of said respective side extension when said shelter frame is mounted in front of said frame body of said primary spectacle frame.

21. The interlockable magnetic shelter frame for mounting on the primary spectacle frame, as recited in claim 20, wherein said two magnets are made to have a thickness larger than a depth of said magnet housing, wherein a pole end of each of said magnets is frontwardly protruded from said respective magnet housing to form said two engaging member.

22. The interlockable magnetic shelter frame for mounting on the primary spectacle frame, as recited in claim 21, wherein each of said engaging members, said magnets and said engagement grooves is in circular shaped, and each of said two magnets having a diameter at least equal to a diameter of said engaging members.

* * * * *